United States Patent
Holt et al.

[11] 3,943,967
[45] Mar. 16, 1976

[54] CARTRIDGE FAUCET

[75] Inventors: James W. Holt, Brookland; John K. Meeks, Jonesboro, both of Ark.

[73] Assignee: Crane Co., New York, N.Y.

[22] Filed: June 16, 1975

[21] Appl. No.: 587,015

[52] U.S. Cl. .............. 137/454.5; 251/205; 251/257
[51] Int. Cl.² .......................................... F16K 25/00
[58] Field of Search ........... 251/205, 251, 259, 252, 251/256, 257; 137/454.5

[56] References Cited
UNITED STATES PATENTS

| | | | |
|---|---|---|---|
| 1,155,576 | 10/1915 | Isley | 251/252 X |
| 1,156,010 | 10/1915 | Kenney | 251/256 X |
| 2,368,281 | 1/1945 | Wittenberg | 251/252 X |
| 3,006,361 | 10/1961 | Reinemann | 137/454.5 |
| 3,165,293 | 1/1965 | McClure | 251/252 |
| 3,789,870 | 2/1974 | Keller | 137/454.5 |

Primary Examiner—Harold W. Weakley
Attorney, Agent, or Firm—George S. Schwind

[57] ABSTRACT

A faucet having a cartridge employing a cam and plunger type of closure means adapted to regulate the flow of fluid therethrough. The plunger, which is in communication with the faucet inlet and is urged away from its seat by the incoming fluid, is restricted in movement by a cam cooperating with a handle to thereby regulate the flow of fluid through the faucet.

15 Claims, 8 Drawing Figures

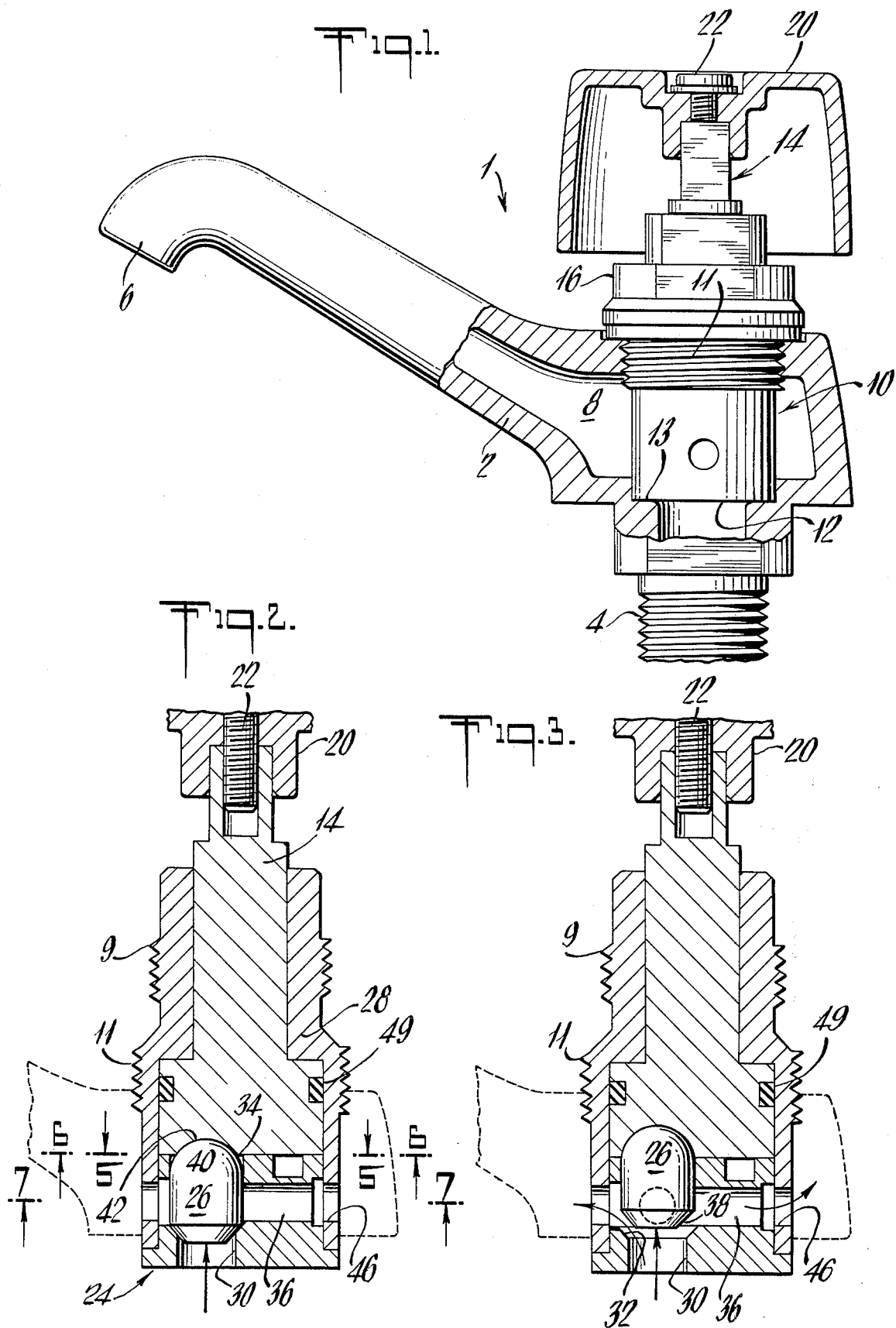

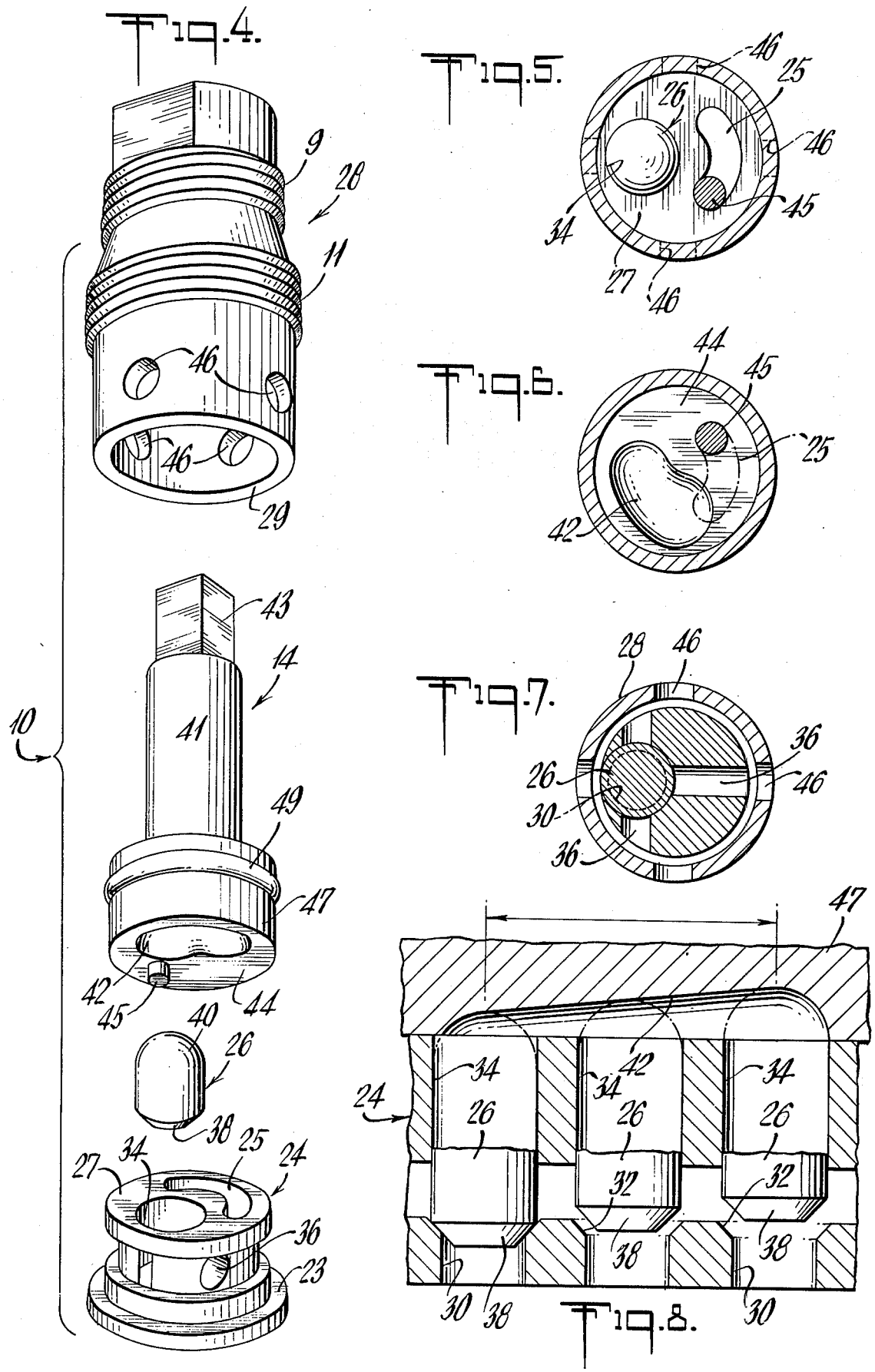

CARTRIDGE FAUCET

SUMMARY OF THE INVENTION

The present invention utilizes a washerless cam and plunger valve structure which is encapsulated in a cartridge whereby actuation of the plunger by the cam means or the incoming fluid controls the flow of fluid through the faucet. This is accomplished by providing a plunger which is adapted to open or close the inlet port of the faucet in response to the other end of the plunger which cooperates with a kidney shaped cam actuated by the user via a handle. The cam, having a variable depth, is positioned by the handle in proximity to the plunger and allows the plunger to move axially as the latter is subjected to the inlet fluid pressure and this will raise or lower with reference to the seat in response to the rotation of the cam. The present invention provides a faucet with a control means which is easy to operate and maintain and eliminates the need for the commonly used seat washers positioned between the stem and fluid inlet seat. The usual wear associated with most stem valve assemblies is eliminated as is the threaded assemblies forming an integral part of such faucets.

It is the primary object of the instant invention to provide an improved washerless valve structure to control the fluid through the faucet by a novel cam and plunger arrangement which is in a cartridge and adapted for use in faucet assemblies in lavatories, kitchen sinks, bathtubs and similar applications.

BACKGROUND OF THE INVENTION

This invention relates to faucets and, in particular, to a cartridge positioned within the faucet having a novel, washerless cam and plunger valve structure which is adapted to regulate the flow of fluid through the faucet by cooperating with a handle which positions the cam. The cam and plunger respond from open to closed by approximately ⅓ turn of the handle. The proposed device is adapted for use in numerous applications including a lavoratory, kitchen sink, bathtub and similar applications where it is desired to control the flow of fluid, and also may be used in combination with hot and cold water lines wherein such combination valves are used to mix the water utilized through the faucet via a single outlet.

Presently, it is common to regulate the flow of fluid through a faucet by means of a washer attached to a stem and handle whereby vertical movement of the stem enables a washer to be compressed against the fluid inlet seat. Normally, the vertical movement is activated by external threading of a stem assembly which is mated with internal threads on the inside of the faucet housing. Such threads and washer create points of wear which often require repair. Thus, it is obvious that there is a need for a valve structure which may be utilized in a common faucet arrangement thereby eliminating the need for such washer and provide a reliable and inexpensive means of controlling fluid, such as hot or cold water, or a combination thereof. The present invention is directed to providing such a device.

Another object of the invention is to provide a cartridge insertable in a faucet which is easily removed and disassembled for maintenance and which is constructed of plastic such as nylon, polypropylene, or similar material which eliminates corrosion forces, coatings and other defect producing actions associated with metal constructions.

It is another object of this invention to utilize a sealing arrangement between the plunger and its seat which does not necessitate any relapping, resurfacing or replacing because of scoring normally associated with compression type faucets employing washers.

Other objects and advantages of the invention will become readily apparent in the following description of the preferred embodiment and description of the drawings.

DESCRIPTION OF THE DRAWINGS

FIG. 1 is a vertical partial cross-sectional view through the faucet showing the novel cartridge arrangement positioned therein.

FIG. 2 is a partial cross-sectional view taken through the center line of the cartridge showing the faucet valve structure in closed position.

FIG. 3 is a partial cross-sectional view taken through the center line of the cartridge showing the faucet valve structure in open position.

FIG. 4 is an exploded perspective view of the cartridge showing the relationship between the components.

FIG. 5 is a partial cross-sectional view taken along lines 5—5 of FIG. 2.

FIG. 6 is a partial cross-sectional view taken along lines 6—6 of FIG. 2.

FIG. 7 is a partial cross-sectional view taken along lines 7—7 of FIG. 2, and;

FIG. 8 is a developed view of the cam and plunger arrangement showing, from left to right, the plunger in its closed, partially opened, and fully opened positions, respectively.

With reference to the drawings, and in particular FIG. 1, a faucet, generally indicated by reference numeral 1, includes a housing 2, having an integral threaded inlet shank 4 and discharge spout outlet 6. Housing 2 is adapted to receive a cartridge 10 comprising a novel valve structure to be hereinafter described which is threadedly positioned within the housing via threads 11, as shown, until the bottom 12 of the said cartridge seals against the base 13 to thereby prevent incoming fluid from leaking into chamber 8. Locking flange 16 is also threadedly engaged onto the cartridge 10 and is secured against housing 2 to thereby prevent relative rotation between said cartridge, flange and housing; and, to compress the bottom 12 of said cartridge to the body. A rotatable stem 14 extending from cartridge 10 has an actuator handle 20 secured thereto by screw means 22 whereby rotation of the handle positions the valve member within the cartridge, not shown, to regulate the flow of fluid passing through the faucet. Inlet shank 4 is adapted to recieve the usual cup washer and lock nut, not shown, whereby the lock nut is threadedly mounted on the shank in the usual manner to enable the faucet 1 to be secured to a lavatory or similar plumbing fixture.

An inlet tail piece or copper tub supplies, both of which are known, also not shown, is then affixed to the end of the inlet shank 4 which is subsequently connected to a source of fluid supply under pressure. Fluid supplied to inlet shank 4 is admitted into the cartridge 10, chamber 8, and discharge spout 6, depending upon the particular position of the valve element within the cartridge, not shown, which is determined by the user positioning the same via handle 20, hereinafter explained.

With reference to FIGS. 2-4, the cartridge 10 includes a novel valve structure comprised of four elements: base 24; plunger 26; stem 14; and centerpiece 28.

Base 24 has an inlet port 30 in its bottom having a tapered portion 32 forming a valve seat which is in communication with the fluid inlet supply via inlet shank 4. Base 24 also includes a vertical, cylindrical plunger chamber 34 having horizontally aligned outlet ports 36 in communication with said port 30 and chamber 34, the latter being adapted to receive cylindrical plunger 26 which is free to move within certain vertical limits to be hereinafter described. Plunger 26 has chamfered end 38 which is adapted to cooperate with tapered portion or seat 32 of inlet 30 to form a valve arrangement note FIG. 2. The other end of plunger 26 is a spherical cam follower 40 which is positioned in a variable depth, kidney-shaped cam recess 42 contoured on the bottom 44 of stem 14. Stem 14 has a portion 41 with a hexagonal, square, or similar configuration, end 43 adapted to receive handle 20, as shown in FIG. 1, to thus prevent relative rotation between the stem 14 and handle 20. It is understood that rotation of stem 14 by handle 20 enables the variable depth cam to vertically position plunger 26 with respect to inlet 30 to thereby control the flow of fluid through the cartridge 10 and faucet 1 as the said plunger will be displaced into the cam due to the pressure of incoming fluid.

A cylindrical, hollow centerpiece 28 is adapted to receive the stem 14, base 24 and plunger 26 whereby the shank 4 will extend from the cartridge 10, and, base 24 is in fluid tight relationship to the centerpiece 28 by virtue of a press tight fit which is formed between the base 24, its flange portion 23 and end portion 29 of said centerpiece. Outlets 46 on the centerpiece 28 permit fluid to pass therethrough into chamber 8 and outlet spout 6.

The stem 40 has a lower cylindrical portion 47 having a circumferential recess adapted to receive an O-ring 49, in the usual manner, to prevent fluid from escaping between the stem 14 and centerpiece 28.

In order to limit the rotation of stem 14 between full-off and full-on position of the plunger 26 with reference to the inlet port 30, an arcuate slot 25 is formed on a top portion 27 of base 24. Stop pin 45 extends into the arcuate slot 25 when the stem 40, plunger 26 and base 24 are assembled whereby the pin will engage the extreme ends of the arc to thereby limit the relative arcuate rotation between the said stem and base. As you can see in FIG. 2, plunger 26 projects beyond the top face 27 of base 24 whereby it is in proximity to the kidney shaped cam 42 which is of variable depth; note FIGS. 4, 6 and 8. With reference to FIG. 8, the particular relationship between the plunger 26 and the cam surface 42 with which it cooperates is shown. The developed view clearly shows how the kidney cam surface 42, positioned by the handle 20, regulates the relationships between chamfered end 38 of plunger 26 and the tapered valve seat 32 to raise or lower the plunger relative to the seat to thereby control the volume of incoming fluid under pressure. It will be understood that rotation of the stem 14 will thereby position the cam surface 42 which is located directly above the plunger 26 in a manner to permit the plunger to be displaced to contact the surface 42 due to the incoming fluid under pressure. In FIG. 2, plunger 26 is positioned so that the port 30 is closed since the chamfered end 38 is in contact with tapered portion 32 of inlet 30. In this position, no fluid will enter the cartridge since the stem and the associated cam follower depress the plunger 26 into sealing relationship with inlet orifice 30. In FIG. 3, the other extreme of travel of the plunger can be seen whereby plunger 26 is positioned in the cam at its maximum depth, also note FIG. 8, and the incoming fluid under pressure will cause the plunger to be displaced from its seat thus allowing fluid to enter the cartridge 10, pass through the centerpiece 28 and through spout 6 to be subsequently discharged.

FIG. 7 shows the relationship between plunger 26 and outlet ports 36 which provide passages for the fluid when the plunger is in an open position thereby enabling the fluid to be discharged from the cartridge via outlets 46 in centerpiece 28 which subsequently enable the fluid to be discharged through the spout 6.

Assemblage of the cartridge 10 is accomplished by placing plunger 26 into its respective chamber 34 and then positioning stop pin 45 of the stem 14 within the cooperating arcuate slot 25. The elements 14, 26 and 24 are then placed into centerpiece 28 until the end 43 projects from the centerpiece and the flange portion 23 of the base 24 is tightly abutted against the centerpiece 28. O-ring 49, which is positioned before elements 14 and 24 are inserted into the centerpiece provides the sealing means as heretofore noted, and, cartridge 10 is threadedly inserted into housing 2 via threads 11 formed on the centerpiece 28. Threaded portion 9, also on centerpiece 28, enables the locking flange 16 to secure the cartridge 10 into the housing 2. Handle 20 is then secured to the hexagonal end 43 to enable the stem 14 to be rotated to thereby position the variable depth cam surface 42 so that plunger 26 may cooperate therewith to open and close the faucet as heretofore described.

I claim:
1. A faucet comprising:
   a. a housing having an interior chamber adapted to receive a valve cartridge, said housing having a fluid inlet and outlet,
   b. a valve cartridge inserted within the interior chamber of said housing between said inlet and outlet, said cartridge including:
      1. a base having an inlet port in communication with said fluid inlet;
      2. a plunger freely positioned in said base in proximity to said inlet port, said plunger adapted to be displaced relative to said inlet port to allow fluid under pressure to pass therethrough;
      3. a centerpiece enclosing said base and plunger, said centerpiece having a plurality of outlet ports in communication with said inlet port and said chamber;
      4. a stem rotatably positioned in said centerpiece, said stem having a variable depth cam in one end thereof cooperating with said plunger whereby rotation of said stem permits said plunger to be displaced relative to said inlet port to thereby control the quantity of fluid passing through said inlet port.

2. A faucet as defined in claim 1 wherein said inlet port is tapered and one end of said plunger has a chamfered end cooperating therewith to form a valve closure means.

3. A faucet as defined in claim 2 wherein said variable depth cam is of arcuate kidney shaped configuration and wherein the other end of said plunger has a rounded end cooperating with said cam.

4. A faucet as defined in claim 1 and further including a handle affixed to said stem.

5. A faucet as defined in claim 1 wherein said cartridge has a threaded portion cooperating with a threaded portion in said housing to thereby secure said cartridge to said housing.

6. A faucet as defined in claim 1 wherein said base, plunger, centerpiece and stem is formed of plastic material.

7. A faucet as defined in claim 1 further including a stop pin projecting from said stem, an arcuate slot formed in said base adapted to receive said pin to limit rotation of said stem.

8. A faucet as defined in claim 1 wherein said base, plunger, centerpiece ans stem are cylindrical.

9. A faucet as defined in claim 1 wherein said outlet included a spout extending from said housing.

10. A faucet comprising:
   a. a housing having an interior chamber adapted to receive a valve cartridge, said housing having a fluid inlet and outlet,
   b. a cylindrical valve cartridge inserted within the interior chamber of said housing between said fluid inlet and outlet, said cartridge including:
     1. a cylindrical base having an inlet port in communication with said fluid, said inlet port having a tapered portion forming a valve seat,
     2. a plunger freely positioned in said base inlet port having a chamfered end cooperating with said inlet port to form a valve closure means, said plunger being vertically guided in said base and adapted to be displaced away from said base by incoming fluid under pressure,
     3. a cylindrical centerpiece enclosing said base and plunger, said centerpiece having a plurality of horizontal outlet ports in communication with said inlet port and said chamber;
     4. a cylindrical stem rotatably positioned in said centerpiece, said stem having a variable depth cam in one end thereof which cooperates with said plunger whereby said plunger is urged against said cam by the incoming fluid under pressure whereby rotation of said stem permits said plunger to be displaced toward said inlet port overcoming said incoming fluid under pressure to thereby control the distance between said plunger and inlet port thus regulating the quantity of fluid passing through said inlet port.

11. A faucet as defined in claim 10 wherein said variable depth cam is of arcuate kidney shaped configuration and wherein the other end of said plunger has a rounded end cooperating with said cam.

12. A faucet as defined in claim 10 and further including a handle affixed to said stem.

13. A faucet as defined in claim 10 wherein said cartridge has a threaded portion cooperating with a threaded portion in said housing to thereby secure said cartridge to said housing.

14. A faucet as defined in claim 10 wherein said base, plunger, centerpiece and stem is formed of plastic material.

15. A faucet as defined in claim 10 further including a stop pin projecting from said stem, an arcuate slot formed in said base adapted to receive said pin to limit rotation of said stem.

* * * * *